July 7, 1959  G. E. EVANS  2,894,052
NON-AQUEOUS PRIMARY CELL AND METHOD OF MAKING THE SAME
Filed Jan. 23, 1957

INVENTOR
GEORGE E. EVANS
BY John F. Hohmann
ATTORNEY

United States Patent Office 2,894,052
Patented July 7, 1959

2,894,052

NON-AQUEOUS PRIMARY CELL AND METHOD OF MAKING THE SAME

George E. Evans, Rocky River, Ohio, assignor to Union Carbide Corporation, a corporation of New York Application January 23, 1957, Serial No. 635,790

4 Claims. (Cl. 136—83)

This invention relates to primary galvanic cells and refers particularly to cells having a non-aqueous solid electrolyte.

In U.S. patent application, Serial No. 533,140, filed September 8, 1955, by D. V. Louzos, there are disclosed, among others, cells of this type in which silver iodide is the electrolyte, silver is the anode, nickel is the cathode collector and the depolarizer comprises an oxide of a polyvalent metal in a higher valence state, for instance, vanadium pentoxide. Cells having these components have proved to have excellent properties and have attracted considerable interest. For certain uses, the cell system disclosed in the Louzos application is most attractive, and there is a demand for batteries incorporating this system, which batteries are of extremely small size. For instance, batteries of 0.3" diameter and 1" length having a voltage of 100 volts are required for a particular use. It has proved not possible to manufacture batteries by the Louzos technique meeting these size requirements.

Further, experience has shown that unless cells employing nickel as the cathode collector are maintained in an absolutely bone dry atmosphere, the nickel is not sufficiently passive to withstand corrosion by the cathode mix. Thus, the cell system described not only does not depend upon water for operation, but actually must be maintained completely free from water for cells to possess desired storage characteristics.

It is the principal object of this invention to provide an improved cell construction in the non-aqueous silver iodide-metal oxide system, which construction makes possible the provision of batteries of extremely small size. Another object of the invention is a cell of this system having improved storage characteristics while being maintained in atmospheres of ordinary humidity. Another object is an improved method of manufacturing cells of the silver-silver iodide-metal oxide type. The invention by means of which these objects are achieved will be described with reference to the accompanying drawing in which:

Figure 1:
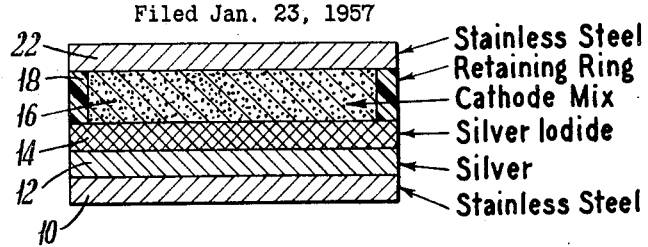
Fig. 1 is a vertical section, greatly enlarged, of a cell embodying the invention.

The invention comprises a substantially non-aqueous primary cell of the silver-silver iodide-metal oxide type wherein a cathode collector of austenitic chromium-nickel steel is employed. In a preferred construction, according to the invention, the cathode collector and silver anode are laminated and employed as a bimetallic element. A preferred metal oxide depolarizer in the cell of the invention is vanadium pentoxide, and the depolarizer mix, at least in the portion thereof adjacent to the electrolyte, contains silver iodide. The invention also includes a method of assembling such cells.

In the construction of the invention the cathode collector of one cell is adjacent to and in contact with the anode of another cell. Referring to the drawing, a member 10 of austenitic chromium-nickel steel (which may serve as the cathode collector of a cell in juxtaposition with the cell to be described) has a layer 12 of silver thereon and preferably united thereto. On the silver layer 12 is a layer of silver iodide formed in the manner to be described below. Adjacent to the silver iodide layer 14, and in contact therewith, is a cathode mix 16 comprising metal oxide depolarizer and finely-divided, inert, electrically conductive material such as micronized graphite or acetylene black. The mix 16 is of lesser width than the width of the elements heretofore described. It is bounded by and supported laterally by a ring or frame 18 of electrically insulating synthetic resin. Adjacent to, and in contact with the upper surface of the cathode mix 16, is a cathode collector 22 of the same material as the member 10 and adjacent to which may be the anode of another cell.

Figure 2:
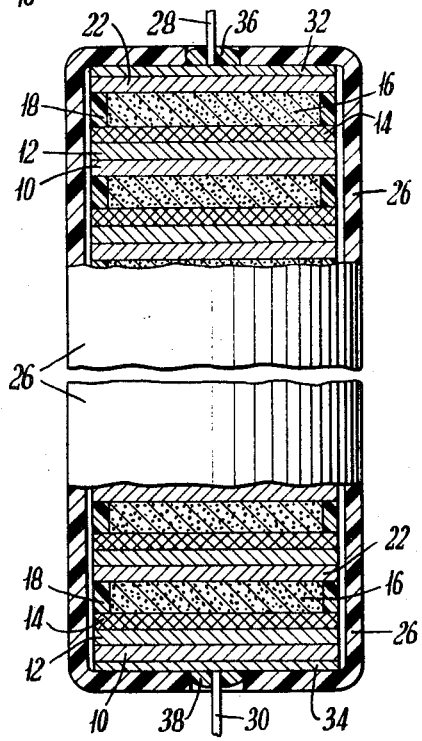
Fig. 2 is a vertical section of a battery of cells of the type shown in Fig. 1.

Cells of the construction just described may be assembled in series relation to form a battery, for instance as shown in Fig. 2, wherein a plurality of the cells are stacked and encased in a suitable container 26 such as an electrically insulating synthetic resin. Electrical contact may be provided to the cell by conductors 28, 30 secured to endplates 32, 34 through sealed apertures 36, 38.

Figure 3:
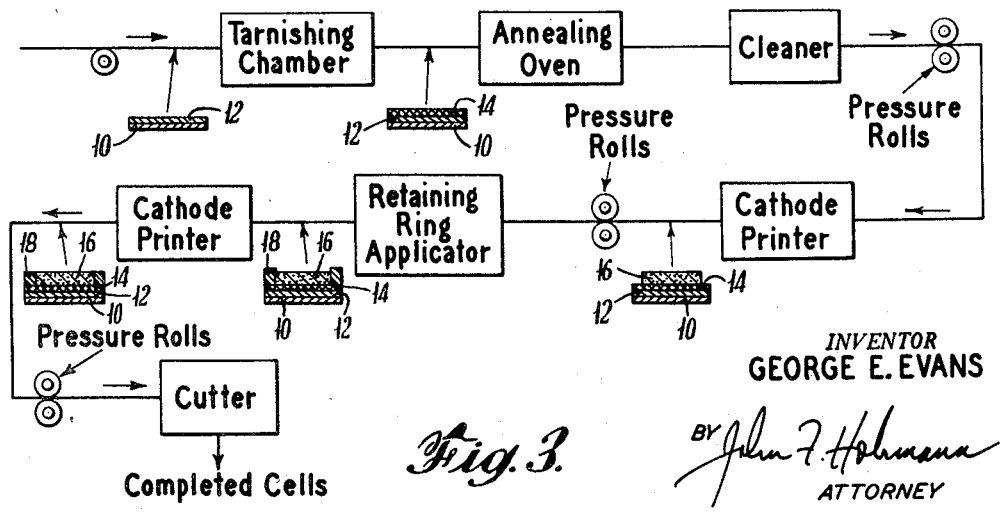
Fig. 3 is a flow sheet illustrating the procedural steps in the manufacture of cells of the type shown in Fig. 1, and showing the cell in section in various stages of manufacture.

The improved construction of the cell of the invention makes possible improved and efficient assembly in a series of operations illustrated in the flow sheet of Fig. 3. By using a bimetallic strip of silver and stainless steel, the strip itself may serve as a conveyer for the cell elements to be deposited thereon. The silver surface of such a strip may be subjected to the action of iodine vapor to cause the silver surface to be tarnished, forming silver iodide which serves as the electrolyte of the cell. Onto the silver iodide surface may then be placed, suitably by a printing technique, a retaining ring of resin. Depolarizer mix may be similarly deposited within the confines of the retaining ring. From the dried strip individual cells may be cut and stacked to form a battery.

More specifically, in accordance with the invention, a bimetallic strip of austenitic chromium-nickel steel, for example, type 302 (17%–19% chromium, 8%–10% nickel, 2% maximum manganese, 0.08%–0.2% carbon) coated with silver on one side may be employed as a duplex electrode. On the silver side of the bimetallic strip a layer of silver iodide is produced. As above indicated, a preferred manner of producing the silver iodide is by a tarnishing technique in which part of the silver is converted to silver iodide by the reaction upon the silver of gaseous iodine. The gaseous iodine is preferably carried in a stream of nitrogen gas. In this technique, to achieve a rapid rate of production, the tarnishing step is conducted at elevated temperature and pressure sufficiently high to result in an altered stoichiometric ratio in the silver iodide. At a minimum temperature of 150° C. and an iodine partial pressure in the range 10 to 50 millimeters of mercury, silver is converted very rapidly into silver iodide. However, the silver iodide so formed is electronically conductive which is not desired in cells embodying the invention. To reconvert the silver iodide so formed to a more suitable form the strip is annealed by heating to a temperature below the iodizing temperature in an inert atmosphere.

In the manner just described stainless steel-silver bimetallic strip has been iodized continuously by passing the strip through an iodizing zone 20 feet long at a rate of 20 inches per minute or faster, the iodizing zone being maintained at a temperature of about 230° C. and an iodine partial pressure of 25 millimeters of mercury.

The iodized strip is then annealed by heating in the range 150° C. to 200° C. for a period of 15 minutes to 3 hours in a nitrogen atmosphere. As indicated, the purpose of the annealing treatment is to reduce the stoichiometric excess of iodine in the silver iodide, and the time and temperature of the treatment are selected with this objective in mind. Treatment should be continued sufficiently long to produce an electronic specific resistivity greater than $10^{13}$ ohm-cm. Another measure of the proper condition of the silver iodide surface is its photosensitivity. A properly annealed material to be satisfactory for the purpose of this invention should withstand exposure to ordinary room lighting (for instance 20 foot candles for ½ hour) without visible darkening.

After annealing of the strip has been completed, any deposit on the stainless steel side of the strip should be removed by cleaning. The strip may then be rolled to compact the silver iodide surface and improve its density, but the rolling pressure should not be so great as to deform the strip. A coating of colloidal graphite may be applied at this point to the stainless steel side of the strip, being useful to prevent corrosion of the stainless steel by the depolarizer mix to be used in the cell.

Onto the silver iodide surface may now be placed the cathode mix (or depolarizer mix) of the cell. Conveniently, the mix is applied in the form of an aqueous slurry or suspension and may be deposited by silk screen technique. For this purpose a cathode mix may consist of 5 parts by weight of silver iodide, 10 parts by weight of vanadium pentoxide and 2 parts by weight of micronized graphite to which may be added about 3% by weight of bentonite as a binder. A slurry containing about 30% to 70% by weight of solids is useful.

The deposit of wet mix is thoroughly dried, for instance, by baking at about 85° C. for 15 minutes, and the dry mix is then compacted at high pressure to increase the density thereof and to improve contact between the mix and the silver iodide electrolyte. Pressures of at least 5 to 10 tons per square inch applied for a few seconds are recommended.

A mix-retaining member of a suitable resin is next applied concentric with the cathode mix and having an inside diameter slightly less than that of the mix and an outside diameter slightly larger than the diameter of the intended complete cell. Suitable materials for the purpose are resins having appropriate viscosity and printing properties so that they may be applied by printing or silk screen techniques. The resin material so applied is converted in situ to rigid form and must be such that it has appropriately high electrical insulation resistance, for instance greater than $10^{14}$ ohm-cm. A suitable material which has been used with satisfactory results is a vinyl plastic in a mixed ketone solvent.

After the plastic mix-retaining member has been solidified, a second deposit of cathode mix may be applied in the same manner as the first was applied. The second deposit may be of the same composition as the first, but preferably is modified somewhat to give maximum lateral electronic conductance. This may be accomplished, for example, by modifying the mix to contain about 3 parts by weight of vanadium pentoxide, 2 parts by weight of micronized graphite and one part of acetylene black, to which mix may be added about 3% by weight of bentonite. After application of this mix, it is dried and compressed as described above. The cell is now complete and may be cut from the strip and individual units stacked to form a battery.

Cells manufactured in accordance with the method just described are extremely thin, for instance, the thickness of the silver iodide electrolyte averages about 15 microns as contrasted with 1125 microns thickness in cells manufactured according to the Louzos disclosure above referred to. The initial voltage of cells manufactured in accordance with this invention averages about 0.455 volt and after storage for one month at 73° C., the voltage of such cells averages 0.449 volt, a drop of only 0.006 volt. The cells manufactured in accordance with the Louzos technique, while having an average initial voltage of 0.490, drop after one month's storage at 73° C. to a voltage of 0.445, or a drop of 0.045 volt. In applications for which these cells are intended, voltage maintenance is of far greater importance than the absolute value of initial voltage. Cells manufactured in accordance with the former methods, when stacked to form a battery, produce about 20 volts per inch, but cells manufactured in accordance with this invention are so thin that batteries may be produced having voltages above 100 volts per inch. Moreover, batteries produced in accordance with the present invention have higher flash currents than can be attained in batteries produced by prior methods. This follows from the fact that the batteries of this invention have an internal resistance one tenth to one twentieth of those produced in the past. Flash currents greater than 50 microamperes per square centimeter have been obtained at room temperature, and at −40° C. flash currents of 5 microamperes per square centimeter have been obtained.

In the above discussion reference has been made to the use of particular materials by way of illustrating the principles of the invention. The invention is not limited to the use of such materials. For instance, instead of type 302 stainless steel, other austenitic chromium-nickel steels such as types 304, 316 and 347 and the like may be employed. Although ferritic chromium steels may also be used, cells in which such steels are employed have a shorter shelf life than those in which the austenitic stainless steels are used. Other alloys and metals resistant to corrosion by the cathode mix may be employed, and it is possible and within the invention to provide surfaces of such materials on cheaper metals such as carbon steel.

With regard to the metal oxide depolarizer, although vanadium pentoxide is preferred, any of the following oxides may be used: manganese dioxide, lead dioxide, tungstic oxide, nickel oxide, and silver oxide ($AgO$ or $Ag_2O$). Of this group, manganese dioxide is presently preferred.

Similarly, although it is preferred that the silver surface of the duplex electrode utilized in the cell of the invention be produced by electrodeposition of silver thereon, the silver may be applied in any convenient way, for instance by vacuum evaporation technique, by metal spraying, by the application of a conductive silver paint or by mechanically cladding.

Instead of forming silver iodide in situ by the tarnishing technique above described, it is possible and within the scope of the invention to apply silver iodide to the silver surface by spraying or by printing operations. For example, an aqueous suspension of silver iodide powder in water stabilized by about 3% by weight of bentonite may be wet milled to produce a suitable slurry containing about 20% solid matter. This slurry may be sprayed in conventional manner onto the silver side of a bimetallic strip. The spray coating may be dried in conventional manner and, after drying, is compacted by rolling, for instance at a pressure of at least about 5 to 20 tons per square inch at a temperature of about 150° C. In some cases it may be desirable to form some silver iodide on the silver surfaces by an iodizing operation and then to deposit additional silver iodide by other methods.

The assembly methods described above may also be modified without departing from the invention, for instance, precut insulating rings of plastic or other material may be used instead of forming the rings in situ. Also, coatings of cathode mix, for instance, may be applied by conventional operations such as printing, roll coating or knife coating or stenciling in addition to the silk screen method. Although the cells illustrated are circular, they need be no particular shape.

It will be evident from the above that the invention provides an improved cell of the non-aqueous silver-silver iodide-metal oxide type. Moreover, the invention provides a particularly flexible, efficient method of manufacturing such cells and assemblying them into a battery.

What is claimed is:

1. In a substantially non-aqueous primary galvanic cell having a silver anode, a solid silver iodide electrolyte, a cathode comprising an oxide of a polyvalent metal in the higher valence state and a cathode collector; the improved construction which comprises said solid electrolyte being chemically adhered to said anode and said cathode collector being stainless steel.

2. In a battery of substantially non-aqueous primary galvanic cells, each of which having a silver anode, a solid silver iodide electrolyte, a cathode comprising vanadium pentoxide, and a cathode collector; the improved construction which comprises said electrolyte being chemically adhered to said anode, and said cathode collector consisting of austenitic chromium-nickel steel, said anode and said cathode collector being in the form of a bimetallic element.

3. A method of manufacturing primary galvanic cells which comprises forming a bimetallic strip of cathode collector metal and anode metal which acts as a carrier for all subsequently provided cell elements; providing electrolyte on the anode surface of said strip; depositing a detached portion of cathode mix for each cell on said electrolyte so that each portion covers less than the entire electrolyte and so that said electrolyte extends peripherally beyond each cathode portion; placing a mix-retaining frame of insulating material peripherally around each cathode portion in substantially total physical contact with said electrolyte, thereby providing all the elements necessary for each cell on said strip; and cutting each cell, as defined by the outer periphery of said mix-retaining frame, out of said strip.

4. The method of manufacturing primary galvanic cells according to claim 3 wherein, said anode is silver, said cathode collector is strainless steel, said electrolyte is silver iodide, and said cathode is an oxide of a polyvalent metal in the higher valence state; said silver iodide electrolyte being provided on said anode by tarnishing such with iodine vapor.

References Cited in the file of this patent

UNITED STATES PATENTS

| | | |
|---|---|---|
| 2,001,978 | Ruben | May 21, 1935 |
| 2,178,969 | Ruben | Nov. 7, 1939 |
| 2,526,692 | Ruben | Oct. 24, 1950 |
| 2,688,649 | Bjorksten | Sept. 7, 1954 |
| 2,690,465 | Broder | Sept. 28, 1954 |
| 2,699,460 | Blake | Jan. 11, 1955 |
| 2,778,754 | Shorr | Jan. 22, 1957 |